United States Patent
Komiya

(10) Patent No.: US 8,339,656 B2
(45) Date of Patent: Dec. 25, 2012

(54) IMAGE FORMING APPARATUS

(75) Inventor: Yoshiyuki Komiya, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 12/966,800

(22) Filed: Dec. 13, 2010

(65) Prior Publication Data
US 2011/0150509 A1    Jun. 23, 2011

(30) Foreign Application Priority Data
Dec. 18, 2009  (WO) .................. PCT/JP2009/071111

(51) Int. Cl.
*G03G 15/043*    (2006.01)
(52) U.S. Cl. ..... 358/1.18; 358/1.13; 358/406; 358/1.12; 358/1.7; 399/51
(58) Field of Classification Search .................. 358/406, 358/1.9, 540, 538, 504, 505, 1.1, 1.13, 1.18, 358/1.6; 399/51
See application file for complete search history.

(56) References Cited

U.S. PATENT DOCUMENTS

| | | | |
|---|---|---|---|
| 7,034,972 B2* | 4/2006 | Ando | 359/196.1 |
| 7,589,846 B2* | 9/2009 | Yoshida | 358/1.13 |
| 2005/0057636 A1* | 3/2005 | Mori | 347/140 |
| 2008/0088889 A1* | 4/2008 | Suzuki | 358/480 |
| 2009/0041489 A1 | 2/2009 | Komiya | |

FOREIGN PATENT DOCUMENTS

| | | |
|---|---|---|
| JP | 2000-293084 A | 10/2000 |
| JP | 2005-304011 A | 10/2005 |
| JP | 2009-039945 A | 2/2009 |
| JP | 2009-039946 A | 2/2009 |
| JP | 2009-294282 A | 12/2009 |

* cited by examiner

*Primary Examiner* — King Poon
*Assistant Examiner* — Allen H Nguyen
(74) *Attorney, Agent, or Firm* — Canon USA Inc. IP Division

(57) ABSTRACT

An image forming apparatus includes a profile storage section that stores distortion characteristic of a scanning line, a correcting section that corrects image data by lines in the sub scanning direction, and a registration sensor that detects a pattern image for detecting color misregistration amounts in a sub scanning direction of images formed on an intermediate transfer member. When the pattern image is formed, the distortion correcting section shifts image data of the pattern image by lines in the sub scanning direction so that, with reference to a detection position of the registration sensor, a positional displacement amount of the pattern image in the sub scanning direction becomes less than or equal to ½ of a scanning-line distance, in accordance with a positional displacement amount of the scanning line in the sub scanning direction at a detection position of the registration sensor along a main scanning direction.

13 Claims, 12 Drawing Sheets

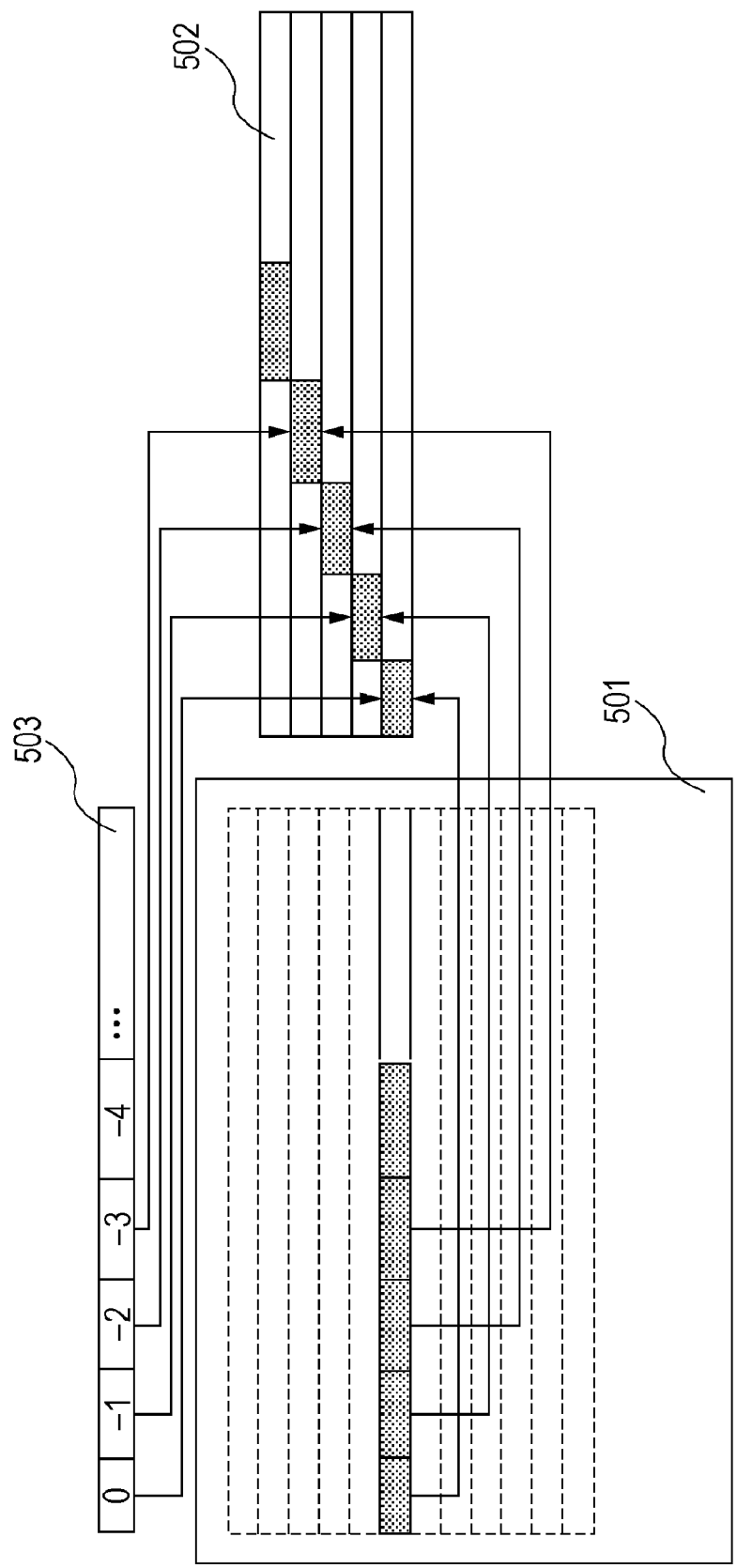

IMAGE FORMING APPARATUS

BACKGROUND OF THE INVENTION

1. Field of the Invention

The present invention relates to an image forming apparatus that, in accordance with image data, scans a photosensitive member with a light beam to form a latent image on the photosensitive member, that develops the latent image on the photosensitive member, and that transfers the developed image to an image bearing member.

2. Description of the Related Art

Recent electrophotographic full-color image forming apparatuses form latent images on photosensitive members for respective color components, develop the latent images on the respective photosensitive members with respective color toners, superpose toner images formed on the respective photosensitive members upon each other on an intermediate transfer member, and then transfers the superimposed toner images to a recording sheet. Various factors, such as displacement of a photosensitive member due to a rise in temperature in the image forming apparatus or mounting/removal of the photosensitive member, cause color misregistration, in which the images of the respective colors are displaced on the recording sheet, to occur. For correcting the color misregistration, Japanese Patent Laid-Open No. 2000-293084 describes a method of correcting an image formation timing for each color by calculating the amount of color misregistration for each color as a result of forming a color misregistration detection pattern image for each color on the intermediate transfer member and detecting these pattern images on the intermediate transfer member with a sensor.

In addition, in electrophotographic image forming apparatuses, laser light beams emitted in accordance with image data are reflected by a rotating polygonal mirror, and scan photosensitive members, thereby forming latent images. When scanning the photosensitive members with the laser light beams, various factors, such as an error in mounting an optical system that is provided at an optical path of the laser light beams, cause a scanning line of the laser light beams on the photosensitive members to be distorted, for example, to be curved or tilted. While the scanning line is distorted, even if the aforementioned color misregistration detection pattern images are formed, the amounts of color misregistration cannot be precisely detected.

For correcting the distortion of the scanning line, Japanese Patent Laid-Open No. 2005-304011 describes a method of performing digital correction of the image data so that the distortion of the scanning line is corrected in accordance with distortion characteristics of the scanning line of the laser light beam, and emitting the laser light beams in accordance with the corrected image data. In the correction of the distortion by the digital correction, a main scanning line that is curved or tilted is divided into a plurality of areas, and image data of each area is shifted by lines in a sub scanning direction so that, when the photosensitive members are scanned therewith, the image data is placed on a reference line. The smaller the division unit in a main scanning direction of each area of the image data that is shifted in the sub scanning direction, the smaller its displacement from the reference line. When processing is performed using software, it takes time, whereas, when the processing is performed using hardware, circuit size is increased, thereby increasing costs. Therefore, the size of the division unit in the main scanning direction may be made large by a certain degree (for example, the division unit is 64 pixels), the processing time using software may be reduced, or the circuit size of the hardware may be reduced.

SUMMARY OF INVENTION

According to an aspect of the present invention, an image forming apparatus is provided including a plurality of image forming units configured to form, by scanning lines of light in a main scanning direction according to image data, a latent image of a respective color on a photosensitive member that rotates in a sub scanning direction, develop the latent image on the photosensitive member in the respective color, and transfer the image developed on the photosensitive member to an image bearing member; a storage unit configured to store a displacement amount of the scanning line of at least one of the plurality of image forming units in the sub scanning direction with respect to a reference line; and a correcting unit configured to correct, in the sub scanning direction, image data of a pattern image for determining a positional displacement between the images formed by the plurality of image forming units, in accordance with the displacement amount stored in the storage unit so that a displacement amount in the sub scanning direction of the pattern image with respect to the reference line at a determination position for determining the positional displacement in the main scanning direction of the pattern image becomes less than or equal to ½ of a distance between neighboring scanning lines, when the image forming unit forms the pattern image.

According to another aspect of the present invention, an image forming apparatus is provided including a plurality of image forming units configured to form, by scanning lines of light in a main scanning direction according to image data, a latent image of a respective color on a photosensitive member that rotates in a sub scanning direction, develop the latent image on the photosensitive member in the respective color, and transfer the image developed on the photosensitive member to an image bearing member; a storage unit configured to store distortion characteristic of the scanning line of at least one of the plurality of image forming units; a correcting unit configured to correct, in the sub scanning direction, the image data so that distortion of the scanning line with respect to a reference line is corrected in accordance with the distortion characteristic stored in the storage unit; and a detecting unit configured to detect a pattern image formed on the image bearing member, the pattern image being provided for detecting a positional displacement between the images of the plurality of image forming units, wherein, when the image forming unit forms the pattern image on the image bearing member, the correcting unit corrects image data of the pattern image in the sub scanning direction in accordance with the distortion characteristic stored in the storage unit so that a positional displacement amount of the pattern image in the sub scanning direction with respect to the reference line at a detection position of the detecting unit in the main scanning direction becomes less than or equal to ½ of a distance between neighboring scanning lines.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates a process of shifting image data in a sub scanning direction according to an exemplary embodiment of the present invention.

DESCRIPTION OF THE EMBODIMENTS

When the division unit in the main scanning direction of each area of the image data that is shifted in the sub scanning direction is made large by a certain degree, depending upon the amount of distortion (curvature, tilting) of the scanning line, there may be pixels whose positions after the correction of the distortion are shifted by approximately one line (one scanning line distance) in the sub scanning direction from the reference line. Therefore, when the color misregistration detection pattern images are formed, even if the distortion is corrected by the aforementioned digital correction, the pattern images are displaced by approximately one line in the sub scanning direction from the reference line, as a result of which a detection error of the color misregistration amount may occur. It is one of the aspects of following embodiments to solve the problem above. And various exemplary embodiments, features, and aspects of the invention will be described in detail below with reference to the drawings.

Figure 1:
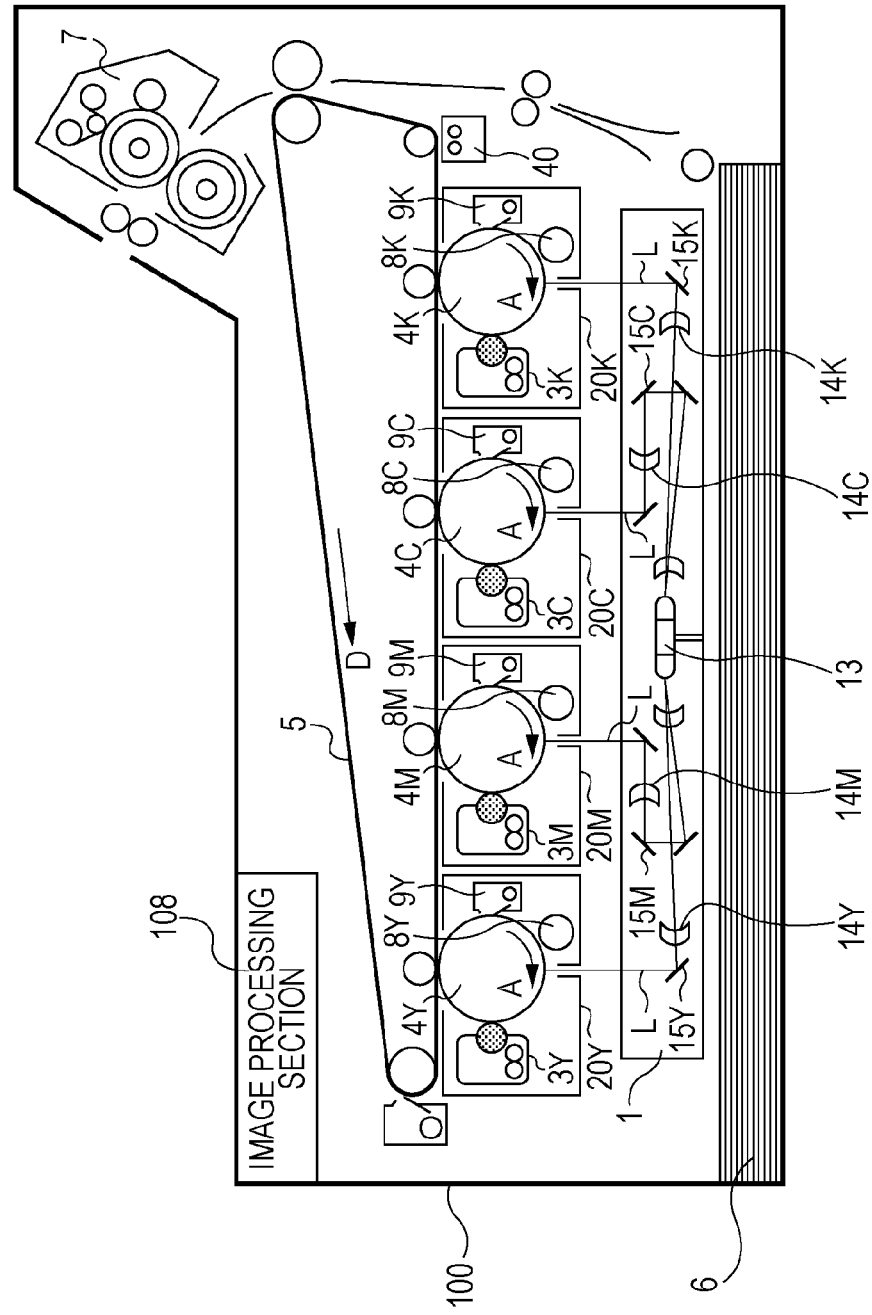
FIG. 1 is a sectional view of an image forming apparatus according to an exemplary embodiment of the present invention.

FIG. 1 is a sectional view of an image forming apparatus 100 according to an exemplary embodiment of the present invention. The image forming apparatus 100 includes process cartridges 20Y (yellow), 20M (magenta), 20C (cyan), and 20K (black) each including, for example, a charger 8, a developing unit 3, a photosensitive member 4, and a cleaner 9. The chargers 8Y, 8M, 8C, and 8K in the respective process cartridges 20Y to 20K uniformly charge the surfaces of the respective photosensitive members 4Y, 4M, 4C, and 4K. Laser light sources 11 in laser units 1 (see FIG. 2) emit laser light beams L in accordance with image data input from an image processing section 108. The laser light beams L scan the photosensitive members 4Y to 4K through mirrors 15, lenses 14, and polygonal mirrors 13, which are disposed in the respective laser units 1, to form latent images on the photosensitive members 4Y to 4K. The photosensitive members 4Y to 4K rotate in the direction of arrow A. The developing units 3Y to 3K in the respective process cartridges 20Y to 20K develop the latent images on the photosensitive members 4Y to 4K with toners of respective color components.

Here, an image formation process performed by the process cartridge 20Y will be described in detail. The surface of the photosensitive member 4Y is uniformly charged with the charger 8Y. Next, the laser unit 1 performs exposure scanning on the photosensitive member 4Y in accordance with yellow image data, to form a yellow electrostatic latent image on the photosensitive member 4Y. The electrostatic latent image on the photosensitive member 4Y is developed by the yellow developing unit 3Y containing yellow toner. Then, a toner image on the photosensitive member 4Y is transferred to an intermediate transfer member 5, which is rotationally driven in the direction of arrow D, at a nip portion between the photosensitive member 4Y and the intermediate transfer member 5. Any residual toner on the photosensitive member 4Y that is not transferred to the intermediate transfer member 5 during a primary transfer is wiped off by a cleaning blade of the cleaner 9Y press-contacted with the photosensitive member 4Y, and is recovered by a waste-toner container. In the other process cartridges 20M, 20C, and 20K, similar processes to that described above are carried out. After toner images of the respective color components formed on the respective photosensitive members 4 are superimposed upon each other at and transferred to the intermediate transfer member 5, the toner images of the plurality of colors on the intermediate transfer member 5 are subjected to secondary transfer to a recording sheet 6 fed from a sheet-feed unit. The recording sheet 6 having the toner images of the plurality of colors secondarily transferred thereto is subjected to fixing with a fixing unit, and discharged.

Figure 2:
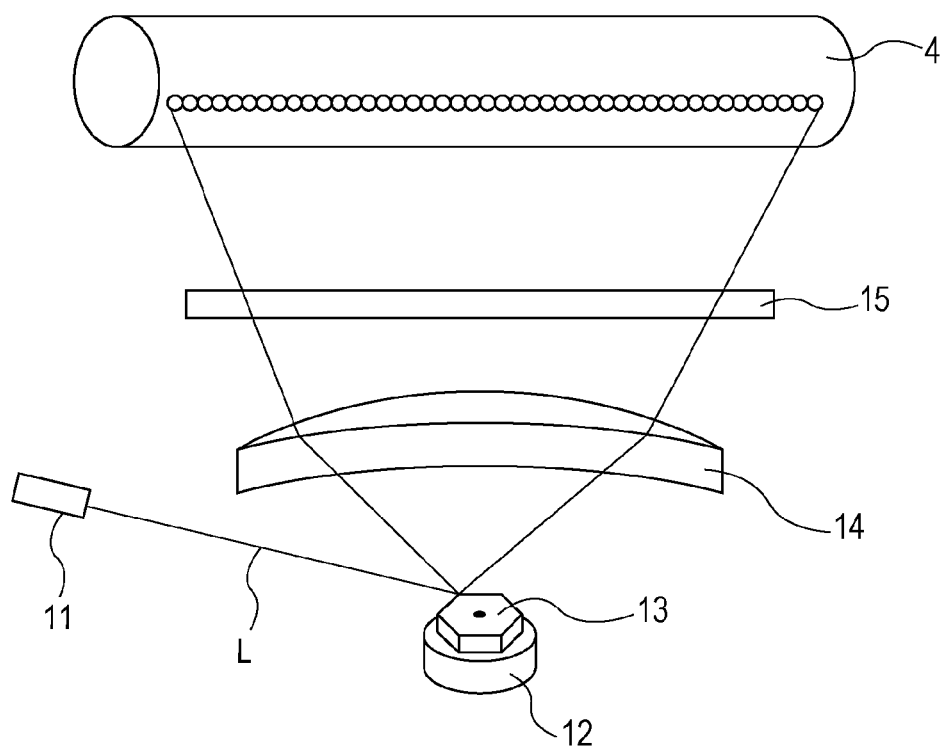
FIG. 2 shows a schematic structure of a laser unit and an ideal scanning line according to an exemplary embodiment of the present invention.
Figure 3:
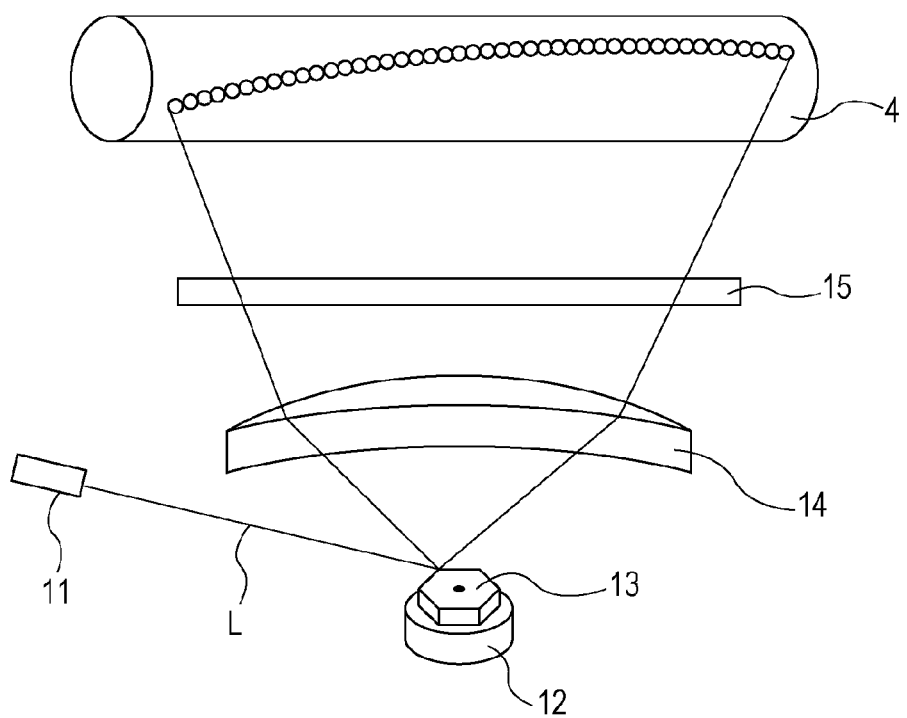
FIG. 3 shows the schematic structure of the laser unit and a distorted scanning line according to an exemplary embodiment of the present invention.

FIG. 2 shows a schematic structure of the laser unit 1. For the sake of simplifying the description, FIG. 2 shows one laser light beam among the plurality of laser light beams emitted towards the process cartridges 20Y to 20K. The laser light beams L emitted from the laser light sources 11 in accordance with the image data are reflected by the polygonal mirrors (rotatable polygonal mirrors) that are rotationally driven by polygonal mirror motors 12, and are deflected in a main scanning direction. The laser light beams L reflected by the polygonal mirrors 13 are reflected by the reflecting mirrors 15 through the f-θ lenses 14, which have a characteristic of causing a linear scanning speed of the laser light beams L on exposure surfaces of the photosensitive members 4 to be constant, and scan the photosensitive members 4. Although, ideally, a scanning line on a photosensitive member is used for horizontal scanning as shown in FIG. 2, the scanning line is actually distorted, for example, is actually curved or tilted, as shown in, for example, FIG. 3. The distortion of the scanning line is characteristic of devices, and depends upon the devices. As measures against the distortion of the scanning line, an expensive optical component may be used or an optical component may be precisely and finely adjusted. However, costs, such as component costs and manpower costs, are increased.

Therefore, in order to take measures against the distortion of a scanning line at a low cost, digital correction of image data is performed so that the distortion of the scanning line is corrected in accordance with distortion characteristics of the scanning line of the laser light beam, and the laser light beam is emitted in accordance with the corrected image data. More specifically, a main scanning line that is curved or tilted is divided into a plurality of areas, and image data of each area is shifted by lines in a sub scanning direction so that each item of image data approaches a reference line when the photosensitive member is scanned, to correct the distortion. This corrects the distortion of the scanning lines.

Figure 4:
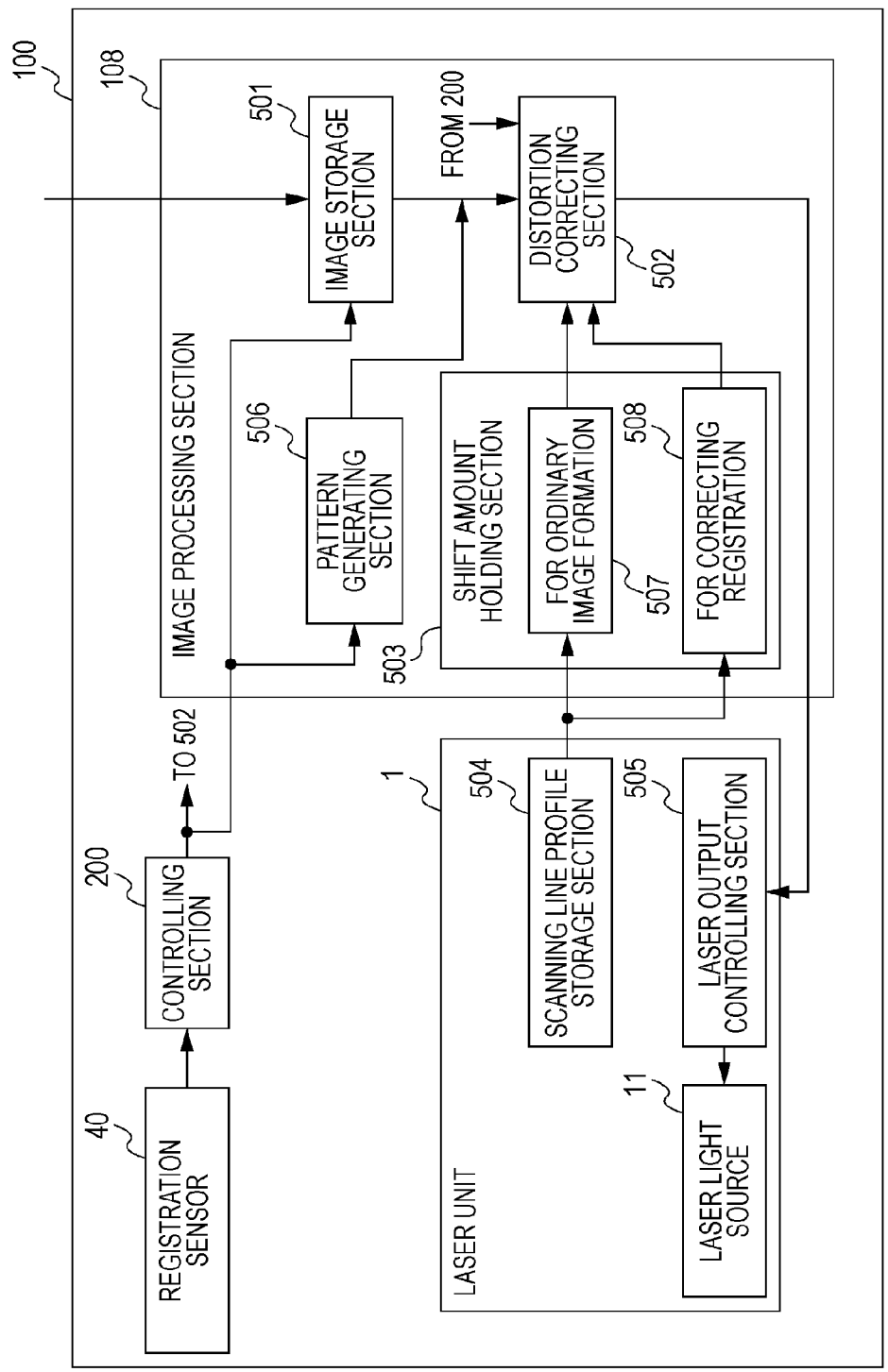
FIG. 4 is a block diagram of an image processing section that corrects the distortion of the scanning line according to an exemplary embodiment of the present invention.
Figure 5A:
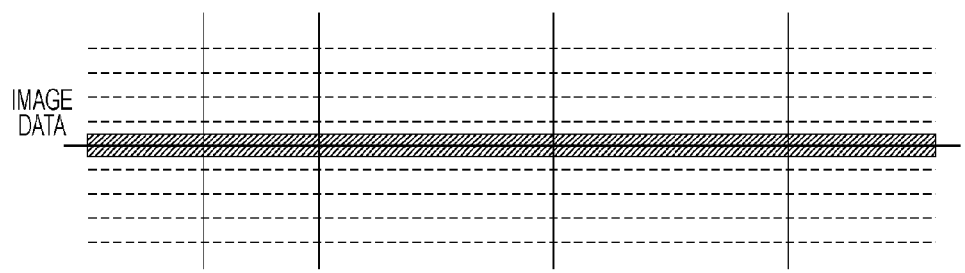
FIGS. 5A and 5B are used to illustrate distortion of a scanning line.
Figure 5B:
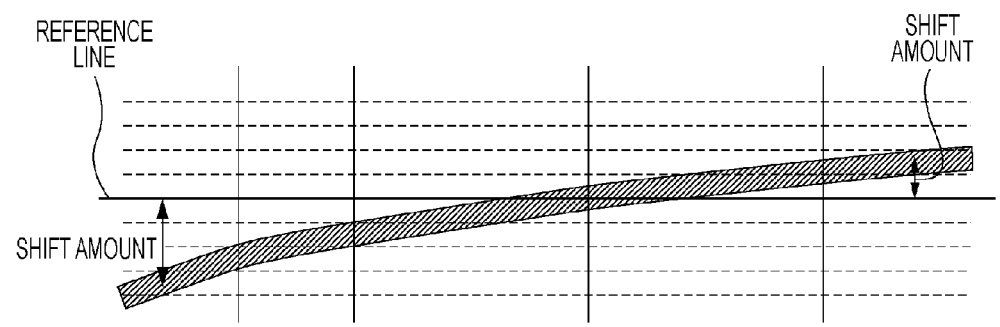

FIG. 4 is a block diagram of the image processing section 108 that corrects the distortion of the scanning line. The laser unit 1 includes a laser output controlling section 505 that performs control to cause the laser light beam to be emitted from the laser light source 11 in accordance with input image data. Four of the laser light sources 11 and the laser output controlling sections 505 are provided in accordance with the photosensitive members 4Y to 4K. The laser unit 1 also includes a profile storage section 504 that stores a scanning-line profile that indicates the distortion characteristics of the scanning line when the photosensitive members 4 are scanned with the laser light beams. The scanning-line profile is data indicating distortion characteristics of a scanning line shown in FIG. 5B when the laser light beams are used for scanning in accordance with image data indicating a straight horizontal line shown in FIG. 5A, and displacement amounts in the sub scanning direction from a reference line at respective main scanning positions (by lines). Each displacement amount is represented on the order of a value that is less than one scanning line distance (such as a tenth place). The scanning-line profile is stored in the profile storage section 504 in correspondence with the four laser light sources 11 corresponding to the photosensitive members 4Y to 4K. Instead of storing all of the displacement amounts of the main scanning positions as the scanning-line profile, it is possible to store only the displacement amounts of a plurality of main scanning positions, and to calculate and determine the displacement amounts of all of the main scanning positions from the displacement amounts of the plurality of main scanning positions.

Figure 7A:
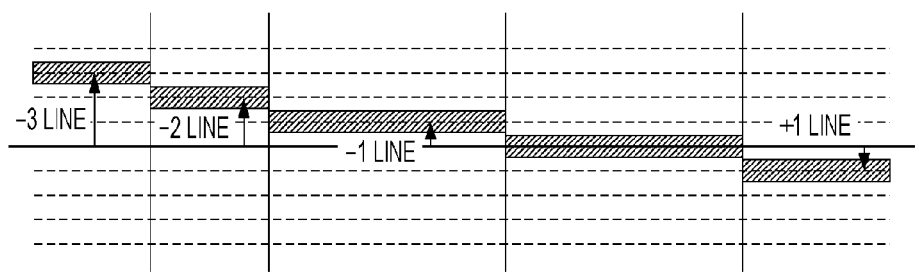
FIGS. 7A and 7B illustrate correction of the distortion of a scanning line according to an exemplary embodiment of the present invention.
Figure 7B:
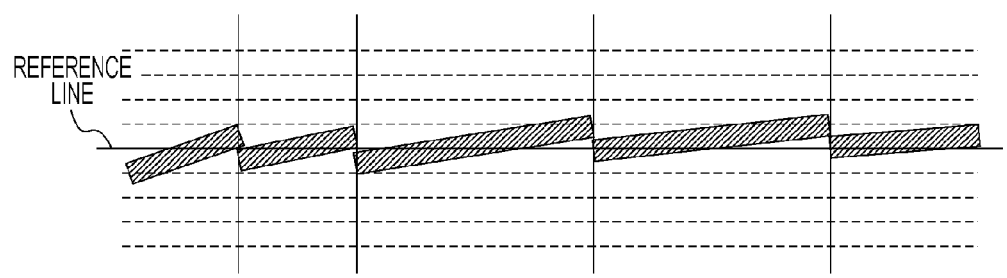

The image processing section 108 includes a shift amount holding section 503 that holds a shift amount in the sub scanning direction of the image data. On the basis of the scanning-line profile stored in the profile storage section 504 in accordance with each area divided by a predetermined number of pixels (such as 32 pixels) in the main scanning direction, the shift amount holding section 503 determines the shift amount by each line in the sub scanning direction of the image data, and causes each shift amount to correspond to its corresponding main scanning position, to hold each shift amount. The image processing section 108 includes an image storage section 501 that temporarily stores input image data, and a distortion correcting section 502 that causes the image data stored in the image storage section 501 to be shifted in the sub scanning direction in accordance with the shift amount held in the shift amount holding section 503. As shown in FIG. 6, the distortion correcting section 502 shifts the image data stored in the image storage section 501 by lines in the sub scanning direction in accordance with the shift amount held in the shift amount holding section 503. With respect to the scanning-line profile shown in FIG. 5B, the distortion correcting section 502 shifts the image data shown in FIG. 5A with each area as shown in FIG. 7A. The distortion correcting section 502 inputs the shifted image data to the laser output controlling section 505, and causes a laser light beam according to the image data to be emitted. By this, the laser light beam is used for scanning with distortion characteristics being corrected so that the laser light beam is placed on the reference line (approaches the reference line) as shown in FIG. 7B.

Figure 8:
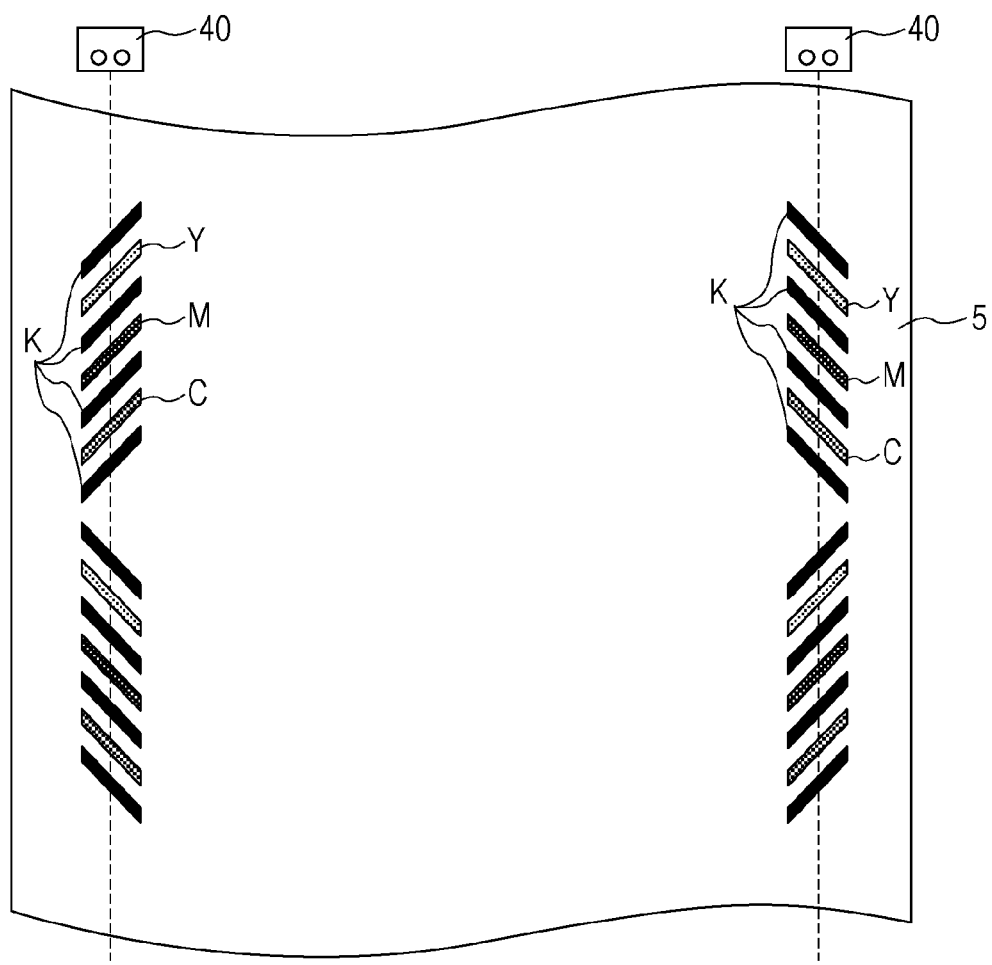
FIG. 8 illustrates image patterns for detecting color misregistration amounts according to an exemplary embodiment of the present invention.

The image processing section 108 includes a pattern generating section 506 for detecting positional displacement amounts (color misregistration amounts) between images of a plurality of colors. The pattern generating section 506 generates items of pattern image data of the respective colors Y, M, C, and K so that the color misregistration detection pattern images shown in FIG. 8 are formed on the intermediate transfer member 5. In accordance with the items of pattern image data of the respective colors Y, M, C, and K, the laser beams are emitted from the respective laser light sources 11 corresponding to the colors Y, M, C, and K, and the pattern images of the respective colors Y, M, C, and K formed by the process cartridges 20Y, 20M, 20C, and 20K, are transferred to the intermediate transfer member 5 as shown in FIG. 8. A registration sensor 40 detects the pattern images on the intermediate transfer member 5. The controlling section 200 calculates the color misregistration amounts of the respective colors with respect to a reference color K in accordance with timings of the detection of the pattern images by the registration sensor 40. For correcting image formation timings in accordance with the respective color misregistration amounts when an ordinary image formation operation is carried out, the controlling section 200 controls, for the respective colors, timings in which the items of Y, M, C, and K image data are stored in the image storage section 501. Here, the intermediate transfer member 5 is an image bearing member where the pattern images are formed.

In the present exemplary embodiment, the pattern images formed on the intermediate transfer member are determined using the registration sensor. In this case, the intermediate transfer member is an image bearing member where the pattern images are formed. The registration sensor determines the pattern images on the image bearing member. However, it is possible to transfer the pattern images to a recording sheet through the intermediate transfer member, and determine the pattern images using the registration sensor provided at a conveying path of the recording sheet. In this case, the recording sheet is an image bearing member where the pattern images are formed. The registration sensor determines the pattern images on the image bearing member. In addition, it is possible to determine pattern images formed on the photosensitive members using the registration sensor. In this case, the shift amounts are calculated from, for example, detection results of the registration sensor and the distances between the photosensitive members. In addition, although, in the present exemplary embodiment, the images are transferred to a recording sheet through the intermediate transfer member, the images formed on the photosensitive members 4Y to 4K may be transferred to the recording sheet. In this case, the pattern images are determined using the registration sensor provided at the conveying path of the recording sheet. Further, when the pattern images are formed on the recording sheet in the aforementioned alternative example, it is possible to determine the pattern images by reading an original with an original reading device that reads the original and outputs original image data to the image forming apparatus. Further, in order to make it possible for an operator to see the color misregistration amounts, it is possible to form on a recording sheet continuous pattern images for two colors having different intervals in the sub scanning direction so that the two colors are adjacent to each other, allow the operator to determine the location where the positions in the sub scanning direction of the pattern images of the two colors match, allow the operator to read numerical values of the shift amounts at the location, and input them to an operating section of the image forming apparatus.

Figure 9A:
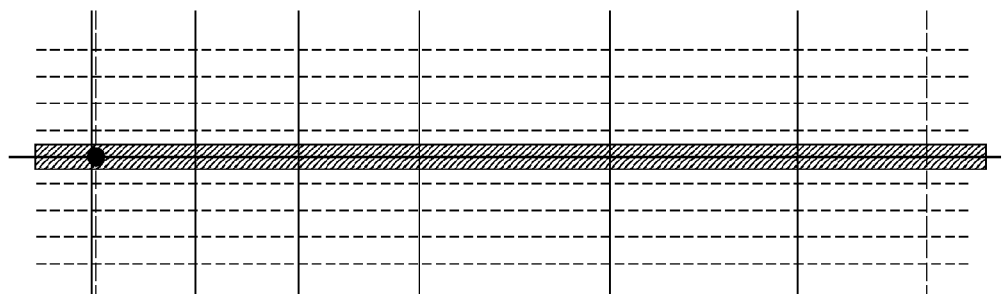
FIGS. 9A and 9B are used to illustrate positional displacement of an image at a position of a registration sensor according to an exemplary embodiment of the present invention.
Figure 9B:
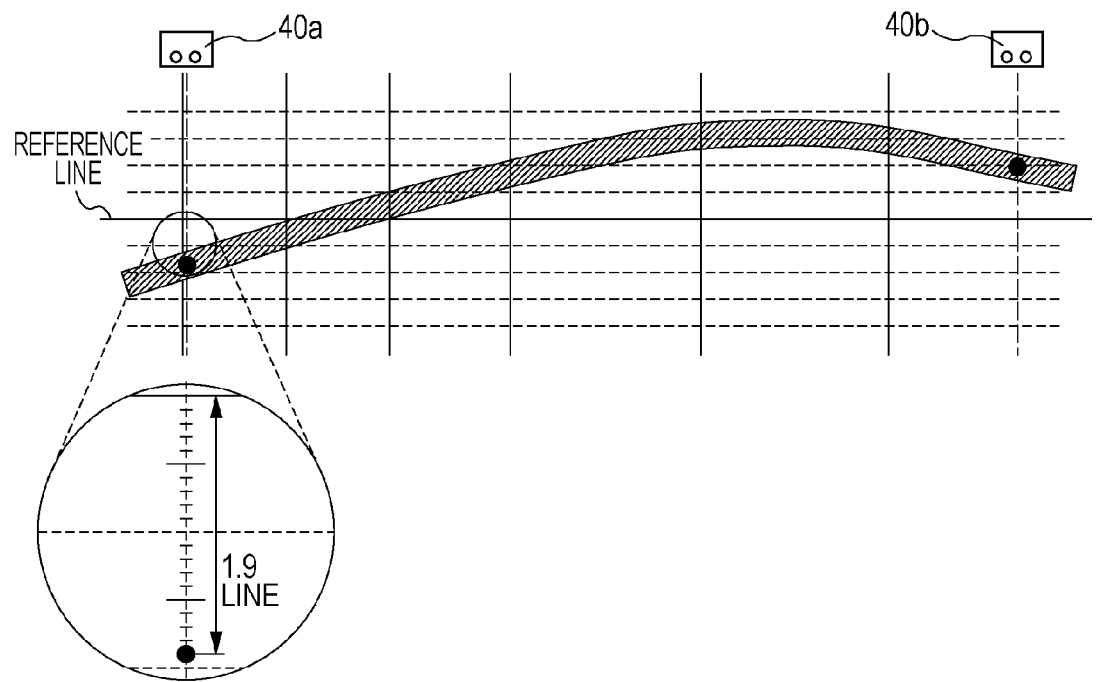
Figure 10A:
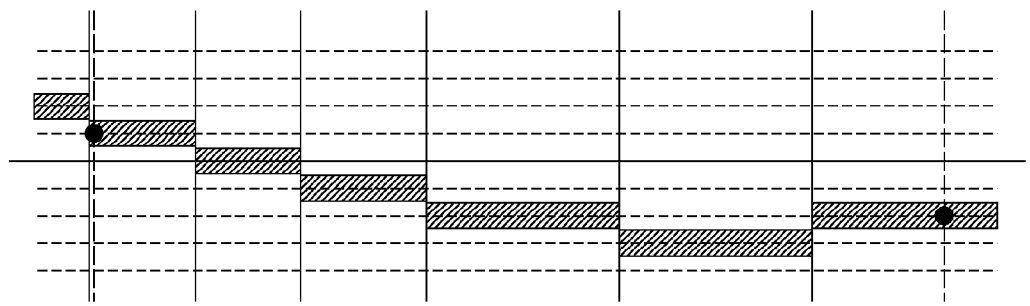
FIGS. 10A and 10B are used to illustrate positional displacement of an image at a position of the registration sensor according to an exemplary embodiment of the present invention.
Figure 10B:
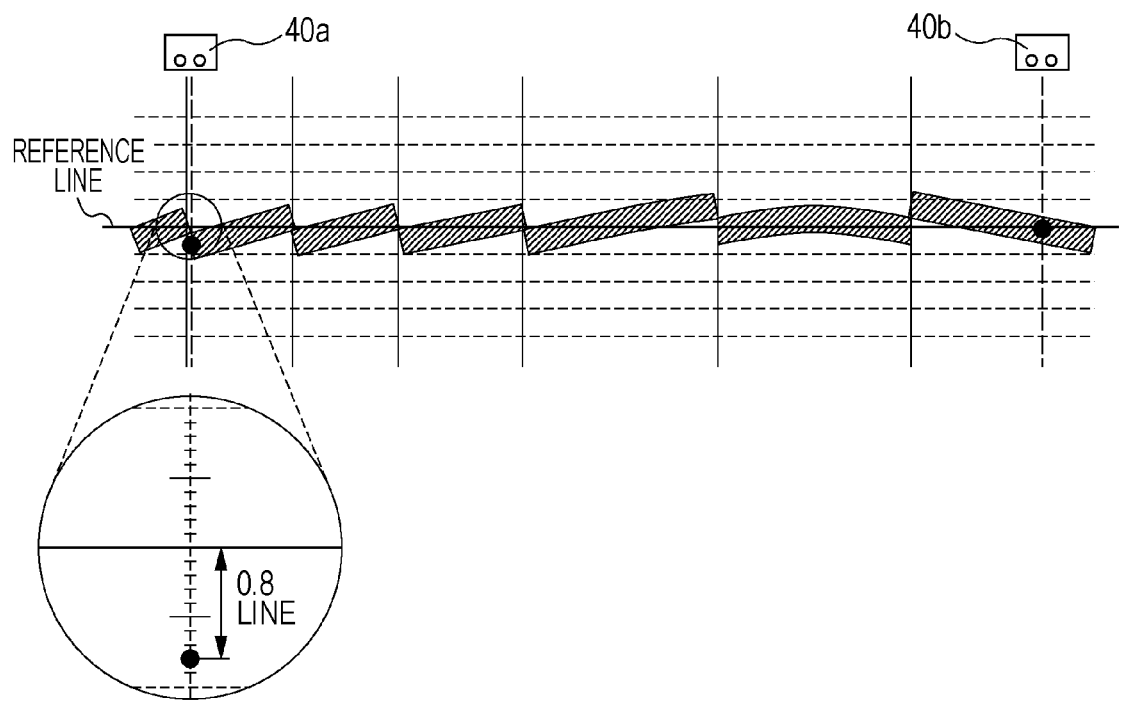

Next, detection of a color misregistration amount considering distortion characteristics of a scanning line is described. FIGS. 9A and 9B are used to illustrate positional displacement in the sub scanning direction of an image formed at a detection position (determination position) of the registration sensor 40 in the main scanning direction. A scanning line according to image data shown in FIG. 9A becomes a scanning line shown in FIG. 9B. Here, if attention is focused on an image at a detection position of a registration sensor 40*a*, the image is displaced by 1.9 lines (scanning distance; hereunder the same) downward from a reference line. FIGS. 10A and 10B are used to illustrate positional displacement in the sub scanning direction of an image formed at a detection position of the registration sensor 40*a* in the main scanning direction. A scanning line according to image data shifted in the sub scanning direction shown in FIG. 10A becomes a scanning line shown in FIG. 10B. If attention is focused on an image at a detection position of the registration sensor 40*a*, the image is displaced by 0.8 line downward from the reference line. In this way, by correcting distortion, the positional displacement of the image at the detection position of the registration sensor 40*a* is reduced. However, as shown in FIG. 10B, since areas are divided near the detection position of the registration sensor 40*a*, the image at the detection position of the registration sensor 40*a* is displaced by approximately one line.

Figure 11A:
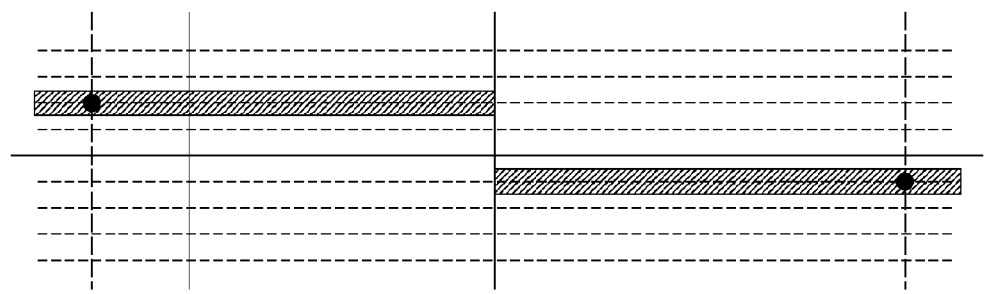
FIGS. 11A and 11B are used to illustrate positional displacement of an image at a position of the registration sensor according to an exemplary embodiment of the present invention.
Figure 11B:
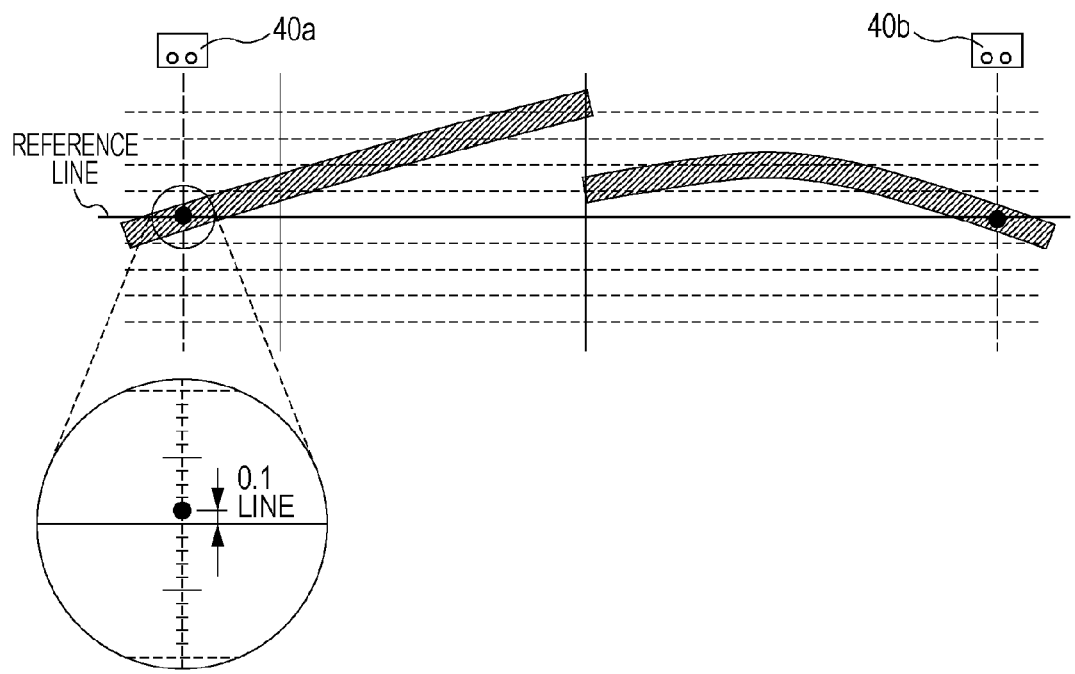

Accordingly, in the present exemplary embodiment, when detecting a color misregistration amount, the distortion correcting section 502 performs an image shift operation on the pattern image with reference to a detection position of the registration sensor 40 along the main scanning direction, instead of shifting the pattern image when performing an ordinary image formation operation, to carry out a positional displacement correction operation suitable for an image at the detection position of the registration sensor 40. That is, the image at the detection position of the registration sensor 40 along the main scanning direction is shifted by lines so that its displacement amount with respect to the reference line is less than or equal to ½ line (less than or equal to a ½ scanning line distance). For example, for a scanning-line profile shown in FIG. 9B, the image at the detection position of the registration sensor 40*a* is displaced downward by 1.9 lines from the reference line. Therefore, in order to shift the image by lines so that the distance from the reference line becomes less than or equal to 0.5 line, the image is shifted upward by two lines as shown in FIG. 11A. A scanning line according to image data shifted in the sub scanning direction, as shown in FIG. 11A, becomes a scanning line shown in FIG. 11B. Focusing attention on an image at a detection position of the registration sensor 40*a*, the image is displaced upward by 0.1 line from the reference line.

Accordingly, when a color misregistration detection operation is carried out, a shift amount that causes the amount of positional displacement of the image at the detection position of the registration sensor 40*a* and the amount of positional displacement of the image at a detection position of a registration sensor 40*b* to become less than or equal to 0.5 line is used instead of a shift amount for ordinary image formation. In this case, the image data is divided into an area including the detection position of the registration sensor 40*a* and an area including the registration sensor 40*b*, to shift the image data of each area in the sub scanning direction. More desirably, the image data is divided into an area including a pattern image to be detected by the registration sensor 40*a* and an area including a pattern image to be detected by the registration sensor 40*b*, to shift the image data of each area in the sub scanning direction. On the basis of the scanning-line profile stored in the profile storage section 504, the shift amount holding section 503 determines shift amounts of the items of image data by lines in the sub scanning direction so that the positional displacement amounts of the images at the detection positions of the registration sensors 40*a* and 40*b* become less than or equal to 0.5 line, to hold the shift amounts in a registration correction holding section 508. In the shift amount holding section 503, the shift amount for the aforementioned ordinary image formation is held in an ordinary image formation holding section 507 of the shift amount holding section 503.

The shift amount holding section 503 determines the shift amounts of the aforementioned pattern images as follows. The shift amount holding section 503 obtains a positional displacement amount MR of the image at the detection position of the registration sensor 40*a* from the profile storage section 504. When the positional displacement amount MR is positive, the displacement is represented as a downward displacement, whereas, when the positional displacement amount MR is negative, the displacement is represented as an upward displacement. When the positional displacement amount MR is positive, the shift amount holding section 503 successively reduces the positional displacement amount MR by one until an absolute value of the positional displacement amount MR becomes less than or equal to 0.5. When the absolute value of the positional displacement amount MR is less than or equal to 0.5, the shift amount holding section 503 adds a negative sign to the value that has been reduced until this time, and causes the holding section 508 to hold this value. When the positional displacement amount MR is negative, the shift amount holding section 503 successively adds one to the positional displacement amount MR until the absolute value of the positional displacement amount MR becomes less than or equal to 0.5. When the absolute value of the positional displacement amount MR is less than or equal to 0.5, the shift amount holding section 503 adds a positive sign to the value to which one has been successively added until this time, and causes the holding section 508 to hold the value. The shift amount holding section 503 performs an operation that is similar to that described above on a positional displacement amount MR of the image at the detection position of the registration sensor 40*b*.

Figure 12:
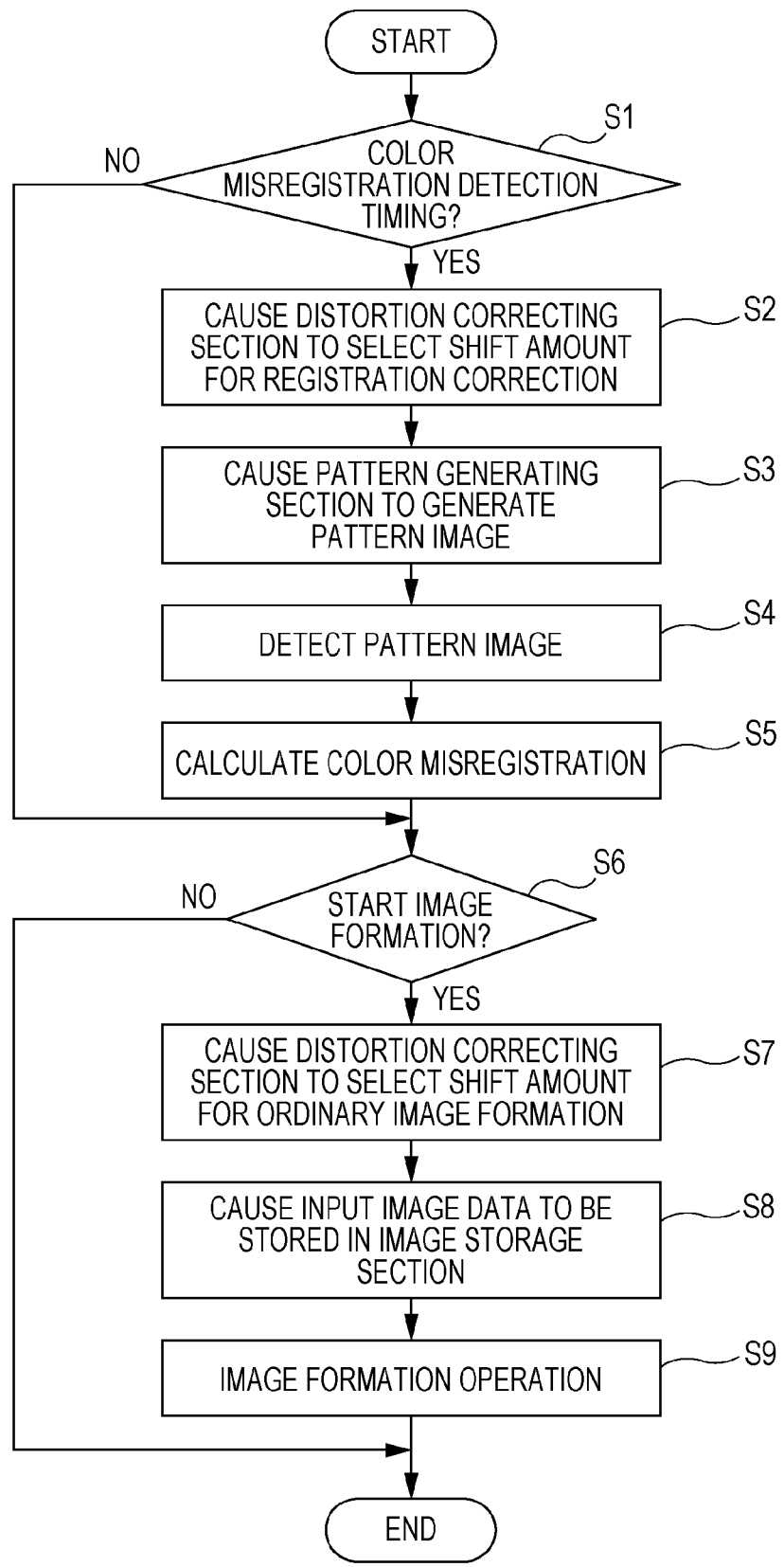
FIG. 12 is a flowchart of control of a controlling section according to an exemplary embodiment of the present invention.

FIG. 12 is a flowchart of control of the controlling section 200. In step S1, the controlling section 200 determines whether or not a timing is a color misregistration detection timing for, for example, when a power supply of the image forming apparatus is turned on or when images are formed on a predetermined number of sheets. In step S2, if the timing is a color misregistration detection timing, the controlling section 200 causes the distortion correcting section 502 to select a shift amount held in the registration correction holding section 508, and causes the distortion correcting section 502 to shift image data by the shift amount for registration correction. Then, in step S3, the controlling section 200 causes the pattern generating section 506 to generate a pattern image, and calculates the color misregistration amount in accordance with a timing of detection of the pattern image by the registration sensor 40 in steps S4 and S5. After step S5 or when it is determined that the timing is not a color misregistration detection timing in step S1, the controlling section 200 determines whether or not an instruction for starting image formation is received in step S6. In step S7, when image formation is started, the controlling section 200 causes the distortion correcting section 502 to select a shift amount held in the ordinary image formation holding section 507, and to shift the image data by the shift amount for registration correction. Then, the controlling section 200 causes the image storage section 501 to store image data input from a personal computer or an image reading device, in step S8, and causes the image forming apparatus 100 to start an image formation operation in step S9.

In addition, although the pattern images are shifted by lines, the shift amount is not limited thereto, so that the pattern images may be shifted by less that one line. In addition, jaggies generated when a pattern image is shifted by lines may be smoothened.

Further, in the above description, when pattern images are formed, shifting by lines is performed with every divided area in the main scanning direction. It is possible to shift only the areas of the pattern images by a separate shift processing section instead of performing the shifting by the distortion correcting section 502.

According to the present invention, it is possible to reduce a detection error of a color misregistration amount occurring when a pattern image for detecting the color misregistration amount is displaced due to distortion of a scanning line.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/071111, filed Dec. 18, 2009, which is hereby incorporated by reference herein in its entirety.

What is claimed is:

1. An image forming apparatus comprising:
a plurality of image forming units configured to form, by scanning lines of light in a main scanning direction according to image data, a latent image of a respective color on a photosensitive member that rotates in a sub scanning direction, develop the latent image on the photosensitive member in the respective color, and transfer the image developed on the photosensitive member to an image bearing member;
a storage unit configured to store a displacement amount of the scanning line of at least one of the plurality of image forming units in the sub scanning direction with respect to a reference line; and
a correcting unit configured to correct, in the sub scanning direction, image data of a pattern image for determining a positional displacement between the images formed by the plurality of image forming units, in accordance with the displacement amount stored in the storage unit so that a displacement amount in the sub scanning direction of the pattern image with respect to the reference line at a determination position for determining the positional displacement in the main scanning direction of the pattern image becomes less than or equal to ½ of a distance between neighboring scanning lines, when the image forming unit forms the pattern image.

2. The image forming apparatus according to claim 1, wherein the storage unit stores distortion characteristic of the scanning line with respect to the reference line, and wherein the correcting unit corrects the image data so that distortion of the scanning line with respect to the reference line is corrected in accordance with the distortion characteristic stored in the storage unit.

3. The image forming apparatus according to claim 2, wherein the correcting unit corrects the image data in the sub scanning direction after dividing the image data in the main scanning direction.

4. The image forming apparatus according to claim 2, wherein the correcting unit corrects the image data by line in the sub scanning direction.

5. The image forming apparatus according to claim 2, wherein the correcting unit corrects the scanning line so that the scanning line approaches the reference line.

6. The image forming apparatus according to claim 2, wherein, when an image according to input image data is formed, the correcting unit corrects the image data so that the distortion of the scanning line with respect to the reference line is corrected, and wherein, when the pattern image is formed, the correcting unit corrects the image data of the pattern image so that the displacement amount in the sub scanning direction of the pattern image with respect to the reference line at the determination position in the main scanning direction of the pattern image is less than or equal to ½ of the distance between neighboring scanning lines.

7. The image forming apparatus according to claim 1, wherein the image bearing member is an intermediate transfer member to which the images of the plurality of colors formed on the plurality of photosensitive members are transferred, and which transfers the transferred images to a recording sheet.

8. The image forming apparatus according claim 1, wherein the image bearing member is a recording sheet.

9. The image forming apparatus according to claim 1, comprising a detecting unit configured to detect the displacement amount of the pattern image formed on the image bearing member at the determination position.

10. The image forming apparatus according to claim 1, wherein the image bearing member is an intermediate transfer member to which the images of the plurality of image forming units are transferred, and which transfers the transferred images to a recording sheet, and wherein the image forming apparatus comprises a detecting unit configured to detect the displacement amount of the pattern image formed on the recording sheet at the determination position.

11. The image forming apparatus according to claim 1, comprising a detecting unit configured to detect the displacement amount of the pattern image formed on the photosensitive member at the determination position.

12. An image forming apparatus comprising:
a plurality of image forming units configured to form, by scanning lines of light in a main scanning direction according to image data, a latent image of a respective color on a photosensitive member that rotates in a sub scanning direction, develop the latent image on the photosensitive member in the respective color, and transfer the image developed on the photosensitive member to an image bearing member;
a storage unit configured to store distortion characteristic of the scanning line of at least one of the plurality of image forming units;
a correcting unit configured to correct, in the sub scanning direction, the image data so that distortion of the scanning line with respect to a reference line is corrected in accordance with the distortion characteristic stored in the storage unit; and
a detecting unit configured to detect a pattern image formed on the image bearing member, the pattern image being provided for detecting a positional displacement between the images of the plurality of image forming units,
wherein, when the image forming unit forms the pattern image on the image bearing member, the correcting unit corrects image data of the pattern image in the sub scanning direction in accordance with the distortion characteristic stored in the storage unit so that a positional displacement amount of the pattern image in the sub scanning direction with respect to the reference line at a detection position of the detecting unit in the main scanning direction becomes less than or equal to ½ of a distance between neighboring scanning lines.

13. The image forming apparatus according to claim 12, wherein the correcting unit corrects the image data by line in the sub scanning direction.

* * * * *